(12) United States Patent
Takita et al.

(10) Patent No.: US 6,675,224 B1
(45) Date of Patent: Jan. 6, 2004

(54) INFORMATION PROCESSING APPARATUS

(75) Inventors: Isao Takita, Yokohama (JP); Naoko Iwami, Sagamihara (JP); Yoshiaki Eguchi, Machida (JP); Shinichi Sawamura, Yokohama (JP); Itaru Nonomura, Tokyo (JP); Toru Owada, Yokohama (JP); Yasushi Nagai, Yokohama (JP); Shinichi Kato, Chitose (JP)

(73) Assignees: Hitachi, Ltd., Tokyo (JP); Kokusai Electric Co., Ltd., Tokyo (JP)

( * ) Notice: Subject to any disclaimer, the term of this patent is extended or adjusted under 35 U.S.C. 154(b) by 0 days.

(21) Appl. No.: 09/500,073

(22) Filed: Feb. 8, 2000

(30) Foreign Application Priority Data

Mar. 1, 1999 (JP) ............................................ 11-052254

(51) Int. Cl.[7] ............................................ G06F 15/173
(52) U.S. Cl. ........................ 709/244; 709/220; 370/398; 710/38; 710/62; 710/63; 710/100; 710/316
(58) Field of Search ................................ 709/220, 244; 370/398; 710/38, 316, 62–63, 100

(56) References Cited

U.S. PATENT DOCUMENTS 5,867,677 A * 2/1999 Tsukamoto ................. 710/316
6,072,803 A * 6/2000 Allmond et al. ............ 370/445
6,434,612 B1 * 8/2002 Hughes et al. .............. 709/223
6,449,680 B1 * 9/2002 Sanders et al. ............. 710/316
6,460,094 B1 * 10/2002 Hanson et al. ................ 710/8

OTHER PUBLICATIONS

"Transistor Technology," pp. 240–249, published by CQ Publishing, Jul. 1997 (with partial English translation).

* cited by examiner

Primary Examiner—Zarni Maung
Assistant Examiner—Jinsong Hu
(74) Attorney, Agent, or Firm—Antonelli, Terry, Stout & Kraus, LLP

(57) ABSTRACT

A system which serves both as a host and a device cannot be realized with a single connector due to the constitution of hardware in the prior art. The prior art system only detects the existence of a device and cannot distinguish between a host and a device while a power source is turned on and switch its function. The information processing apparatus of the present invention separates the data lines of a host communication controller and the data lines of a device communication controller and activates the selected controller by means of selecting the data lines of the controllers and means of determining which is connected to a connector, a host or a device.

6 Claims, 6 Drawing Sheets

INFORMATION PROCESSING APPARATUS

BACKGROUND OF THE INVENTION

The present invention relates to an interface switching technology which enables one apparatus connected to a network which has different interface specifications for a host and a device to function both as a host and a device.

As described at pages 240 to 249 of "Transistor Technology" published in July 1997, interface modules for a host and a device differ from each other in specifications. This system will be described with reference to FIG. 6. FIG. 6 is a structural diagram of the prior art.

A host communication controller 601 is connected to a device communication controller 605 by data lines 602 and 603 of a network. A resistor 604 having a resistance value R1 is connected to the ground at one end and to the data lines 602 and 603 at the other end and a resistor 606 having a resistance value R2 is connected to a power source at one end and to the data line 602 at the other end.

When a device is not connected to the network, this can be confirmed from the fact that both the voltages of the data lines on a host side become a ground level. When a device is connected to the network, this can be automatically confirmed from the fact that the potential of the data line 602 which is determined by voltage division between R1 and R2 becomes larger than the ground level. When a device is not connected, the host communication controller 601 does not need to operate. When a device is connected, communication can be automatically carried out by detecting a change in the potential of the data line 602. Further, since the existence of a device is detected from the potential of the data line 602 in this network, it is possible to connect and disconnect the data lines while the power source is kept on.

In the conventional system, a system which serves both as a host and a device cannot be realized by a single connector due to the constitution of hardware. The conventional system only detects the existence of a device and cannot distinguish between a host and a device while a power source is kept on and switch its function.

SUMMARY OF THE INVENTION

It is an object of the present invention to provide an information processing apparatus which realizes a system for switching between a host and a device and a system for switching between a host and a device while a power source is kept on to enable an information apparatus such as a handy phone or portable terminal to serve as a host to control peripheral equipment at a time and as a device (modem in case of a handy phone) for another information processing apparatus at another time and to enable a device having the improved performance of a CPU to be used as a stand-alone information apparatus.

The information processing apparatus of the present invention makes possible communication by activating a selected controller with means of separating the data lines of a host communication controller and the data lines of a device communication controller and selecting the data lines of one of them and means for determining which is connected to a connector, a host or a device.

BRIEF DESCRIPTION OF THE DRAWINGS

These and other objects and advantages of the present invention will become clear from the following description with reference to the accompanying drawings, wherein.

DETAILED DESCRIPTION OF THE INVENTION

Figure 1:
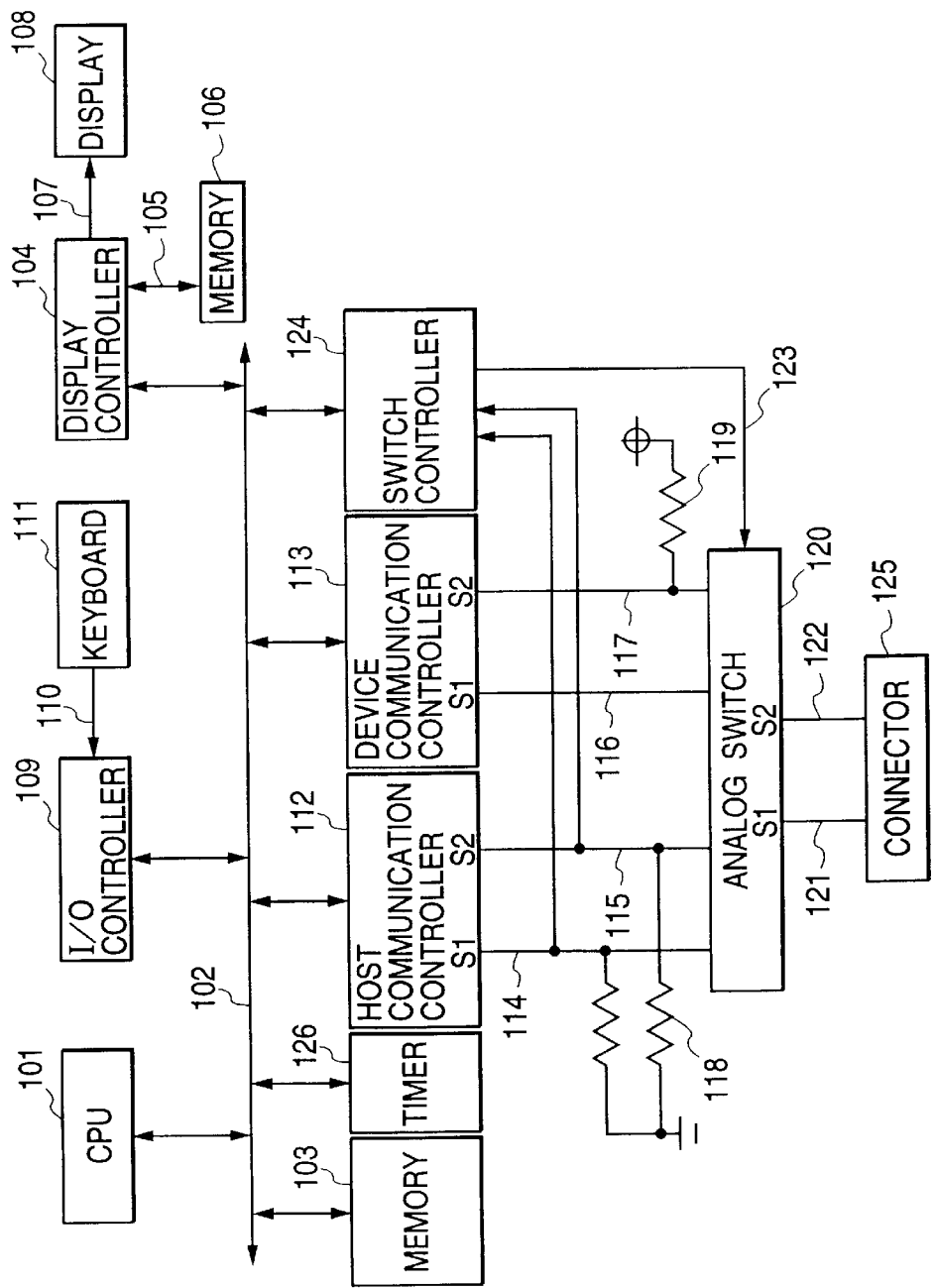
FIG. 1 is a block diagram of an information processing apparatus.
Figure 2:
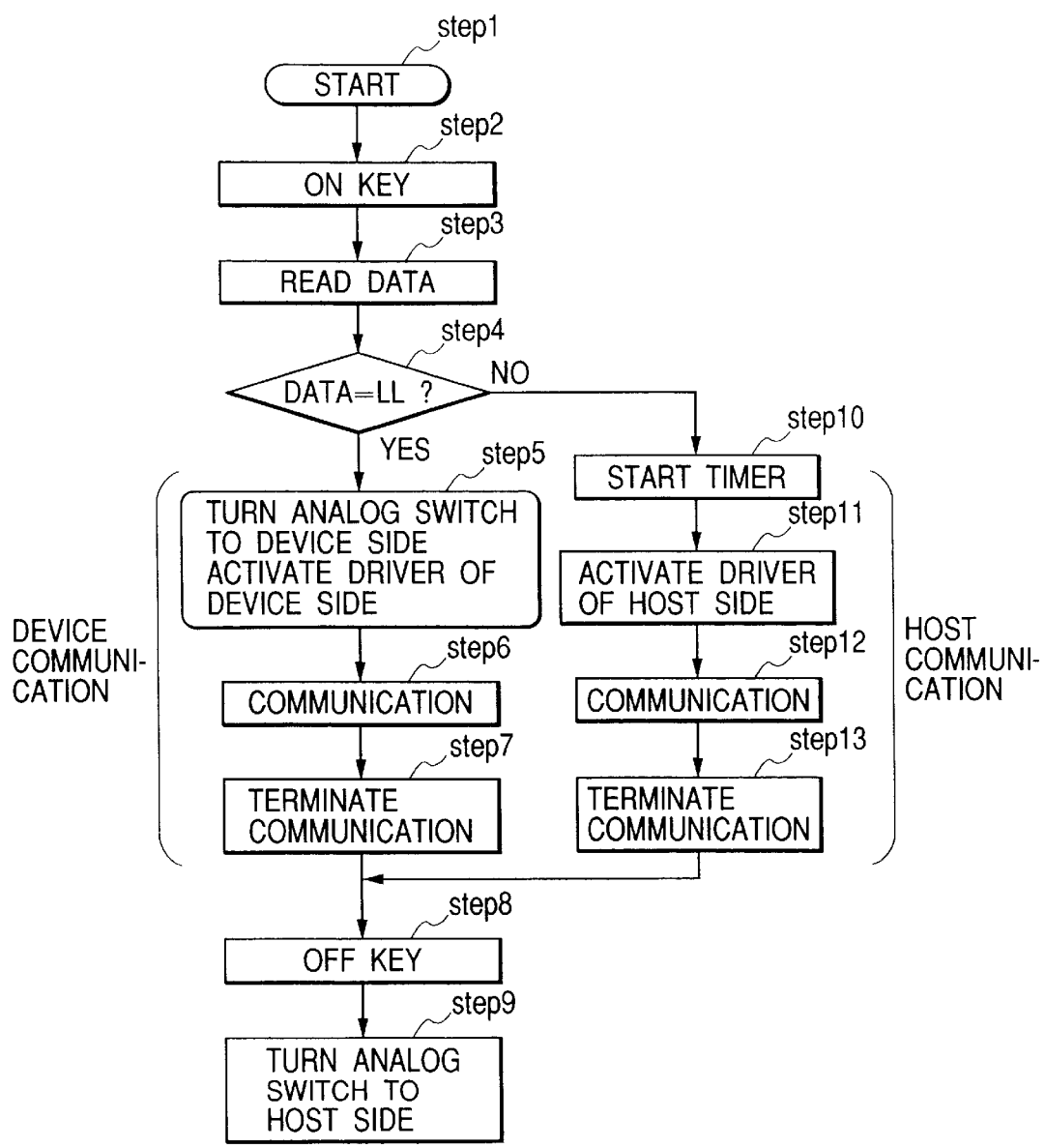
FIG. 2 is a flow chart for switching between controllers.

A first embodiment of the present invention will be described with reference to FIG. 1 and FIG. 2. FIG. 1 is a block diagram of an information processing apparatus and FIG. 2 is a flow chart for switching between controllers.

A CPU 101, an I/O controller 109 for controlling I/O, a display controller 104, a memory 103, a timer 126 for measuring time, a host communication controller 112, a device communication controller 113 and a switch controller 124 are connected to a system bus 102. The display controller 104 is connected to a display 108 by a display bus 107 and to a display memory 106 by a display memory bus 105. The I/O controller 109 is connected to a keyboard 111 which is one of I/O devices by an I/O data line 110. A resistor 118 is connected to the ground at one end and to the data lines 114 and 115 of the host communication controller 112 at the other end. A resistor 119 is connected to a power source at one end and to one of data lines 116 and 117 of a device communication controller 113 at the other end. The switch controller 124 controls an analog switch 120 based on the states of the data lines 114 and 115. Output data lines 121 and 122 connected to a pair of data lines selected by the analog switch 120 based on a control line 123 from the switch controller 124 are connected to a connector 125 for connecting an external host or device.

The CPU 101 accepts the input data of the keyboard 111 from the I/O controller 109 based on a program stored in the memory 103 and stores the processing result of the program in the display memory 106 through the display controller 104. The display controller 104 reads display data stored in the display memory sequentially and outputs the display data in synchronism with the display 108 to display them. The timer 126 supplies an interrupt signal to the CPU after the passage of a time written by the CPU to inform the CPU of the passage of the time.

The switch controller 124 monitors what is connected to the connector 125 from the states of the output lines 114 and 115 of the host communication controller 112. At the time of start or when a cable is not connected to the connector 125, the switch controller 124 outputs "L" to the analog switch 120 over the control line 123 and the analog switch 120 connects the output lines 114 and 115 to the output data lines 121 and 122. When the switch controller 124 outputs "H" to the control line 123, the analog switch 120 connects the output lines 116 and 117 to the output data lines 121 and 122.

Details on how to change the output lines will be described with reference to FIG. 1 and FIG. 2.

After the activation of the information processing apparatus, the switch controller 124 outputs "L" to the control line 123. Thereby, the output lines 114 and 115 are connected to the output data lines 121 and 122. Meanwhile, the host communication controller 112 and the device communication controller 113 are at stand-by (step 1).

Thereafter, when a cable is connected to the connector 125, an ON key is input as shown in FIG. 2 (step 2). The ON key is input from the keyboard 111. The CPU 101 confirms from the input of the ON key that the cable is connected.

Then, the states of the output lines 114 and 115 which are the data of the switch controller 124 are read (step 3). When the states of the output lines 114 and 115 are "LL" at this point, the cable is connected to a host. Since the output lines are both pulled down to the ground based on the specifications of the host communication controller, "LL" means connection between hosts.

The information processing apparatus recognizes that the cable is connected to a host (step 4) and causes the switch controller to output "H" to the control line 123. Thereby, the output lines 116 and 117 of the device communication controller 113 are connected to the output data lines 121 and 122. Meanwhile, since the states of the output lines 114 and 115 are "LL", the information processing apparatus must serve as a device. Therefore, the device communication controller 113 is activated from a stand-by mode (step 5). Thereafter, communication with the host is carried out (step 6) and then terminated to disconnect the cable (step 7) and an OFF key is input from the keyboard 111 (step 8). The CPU 101 confirms the OFF key, returns the device communication controller 113 to a stand-by mode and instructs the switch controller 124 to output "L" to the control line 123 (step 9).

When the data of the switch controller 124 is not "LL" after the connection of the cable, the timer 126 is started to wait for a time until the preparation of a device side is completed (step 10), and the CPU 101 activates the host communication controller 112 (step 11) because a device is connected to the cable. After the end of communication with the device and the disconnection of the cable (steps 12 and 13), the OFF key is input (step 8) and the host communication controller is returned to a stand-by mode (step 9).

Thus, host communication and device communication can be carried out separately. In this embodiment, the ON key and the OFF key are input from the keyboard 111 but the existence of a cable may be checked by other means. For example, the same effect is obtained by automatically turning on a switch when a cable is connected and turning off the switch when the cable is disconnected. When a single LSI is used to integrate some of the functions which are separated from one another in the block diagram, there is no problem with the functions.

A second embodiment of the present invention will be described with reference to FIG. 3.

Figure 3:
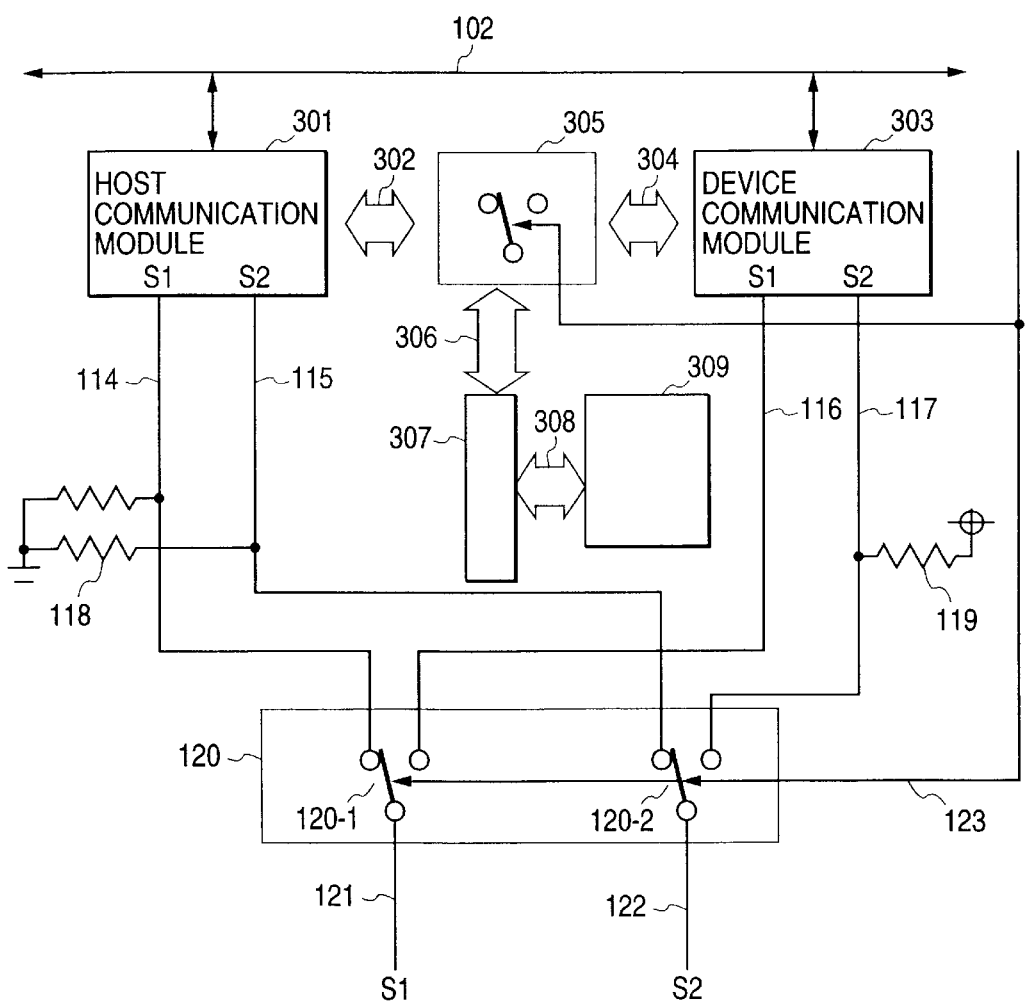
FIG. 3 is a block diagram of a communication memory module.

FIG. 3 is a block diagram of a communication memory module for a system for sharing a memory module for the communication of the host communication controller 112 and the communication of the device communication controller 113 of the first embodiment.

The communication memory module shown in FIG. 3 comprises a host communication module 301 obtained by excluding a memory module for communication from the host communication controller 112, a host side bus 302 for a write or read control signal and data for data communication with the shared memory module, a device communication module 303 obtained by excluding a memory module for communication from the device communication controller 113, a device side bus 304 for a write or read control signal and data for data communication with the shared memory module, a bus switch group 305 for selecting either one of the host side bus 302 and the device side bus 304 and connecting the selected bus to a memory module bus 306, the memory module bus 306 for connecting the bus switch group to the memory module, a memory module control circuit 307 for controlling the memory module, a control bus 308 which is the output of the memory module control circuit 307 and the memory module 309.

The operation of this second embodiment will be described with reference to FIG. 3.

When a host side is selected by the control line 123, the bus switch group 305 connects the host side bus 302 to the memory module bus 306 to enable the host communication module 301 to access the memory module 309.

For example, when writing to the memory module 309, the host communication module 301 transfers necessary information such as a write request and data to the host bus 302. The information is transferred to the memory module control circuit 307 through the bus switch group 305 and the memory bus 306. The memory module control circuit 307 rearranges write data according to the sequence of the memory cells of the memory module 309 and outputs the data to the control bus 308 in synchronism with a control signal to store them in the memory module 309. When reading, read information is transmitted to the memory module control circuit 307 through the bus switch group 305 and the memory module bus 306, and the memory module control circuit 308 selects data to be read and transfers the data to the host communication module 301 through the memory module bus 306.

When a device side is selected by the control line 123, the device side bus 304 and the memory module bus 306 are connected to the bus switch group 305 to enable control similar to that on the host side. As a result, the memory module used for communication can be shared, thereby making it possible to halve the capacity of the memory module used for communication.

Further, when write and read are requested simultaneously, a write bus and a read bus are prepared as the host side bus 302 and a memory which can be accessed for reading and writing simultaneously is used as the memory module 309. When data has a data length like a packet and packets are transferred continuously several times, two memory modules having a memory capacity larger than the packet size are prepared for reading and writing and exchanged right after reading and writing packet-sized data end, thereby making it possible to carry out reading and writing simultaneously.

A third embodiment of the present invention will be described with reference to FIG. 4.

Figure 4:
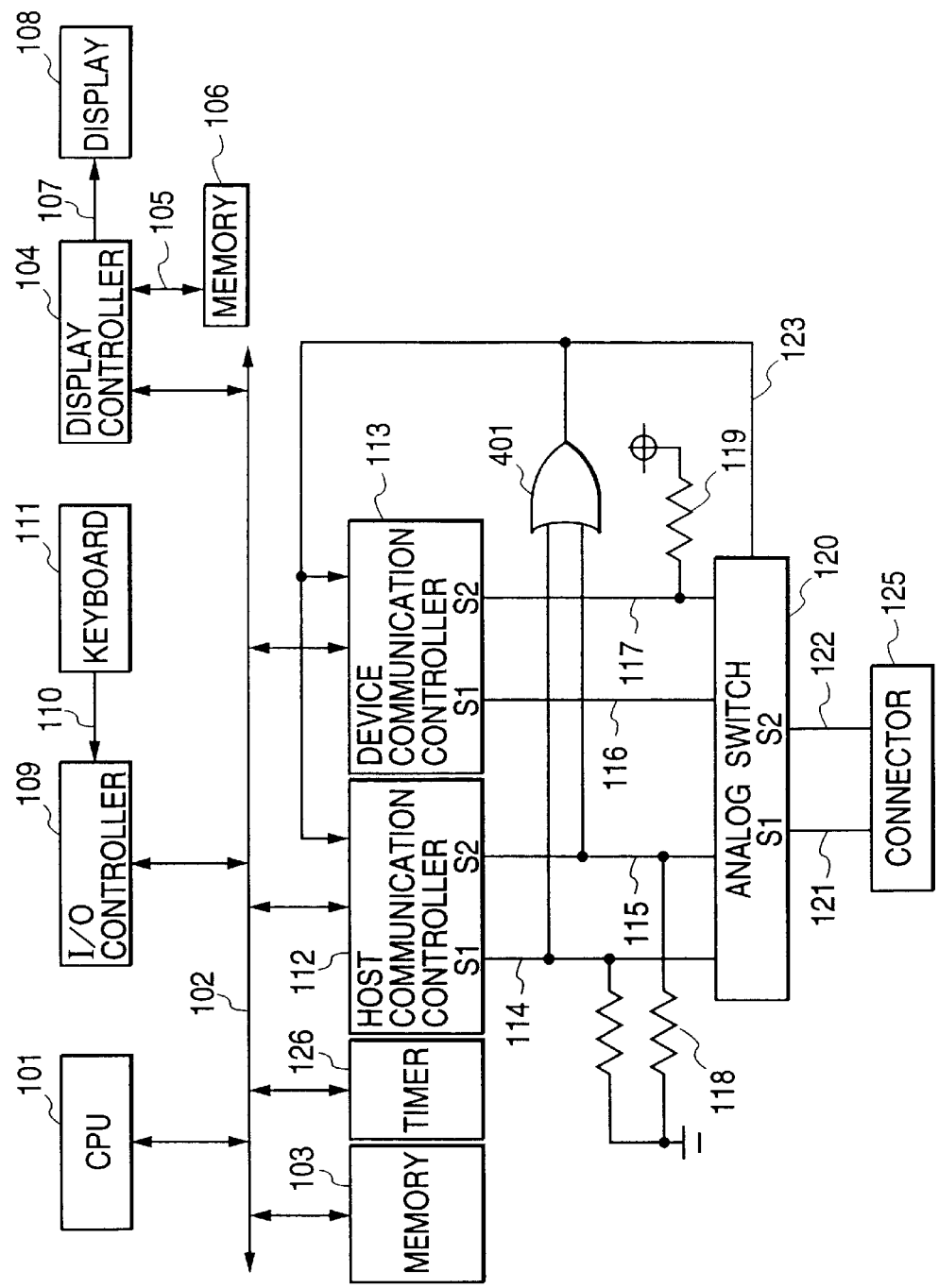
FIG. 4 is a structural diagram of automatic switching.

FIG. 4 is a structural diagram of an information processing apparatus for automatically switching between a host and a device. In FIG. 4, a two-input OR element 401 outputs "L" when its input is "LL". In other cases, that is, when its input is "LH", "HL" or "HH", it outputs "H".

As shown in the first embodiment, when the states of the signal lines 114 and 115 are "LL", it means connection between hosts and the apparatus must be changed to a device. The control line 123 which is the output of the OR element 401 for receiving the inputs of the signal lines 114 and 115 becomes "L" and the analog switch 120 connects the output lines 116 and 117 on a device side to the output data lines 121 and 122. In the case of other combinations, the control line 123 which is the output of the OR element 401 becomes "H" and the output data lines 121 and 122 are connected to the output lines 114 and 115. Thus, a host and a device are automatically switched based on the potential states of the connected lines.

The state of the control line 123 at this point is input into the host communication controller 112 and the device communication controller 113. When the control line 123 is at "L", the device communication controller 113 is activated and an interrupt signal is supplied to the CPU 101 to inform that the controller 113 is activated. Thereby, the CPU 101 uses a communication processing program for a device to carry out communication. On the contrary, when the control line 123 is at "H", the host communication controller 112 is activated and an interrupt signal different from that for a device is supplied to the CPU 101 to inform that the controller 112 is activated. Thereby, the CPU 101 uses a communication processing program for a host to carry out communication.

A fourth embodiment of the present invention will be described with reference to FIG. 5.

Figure 5:
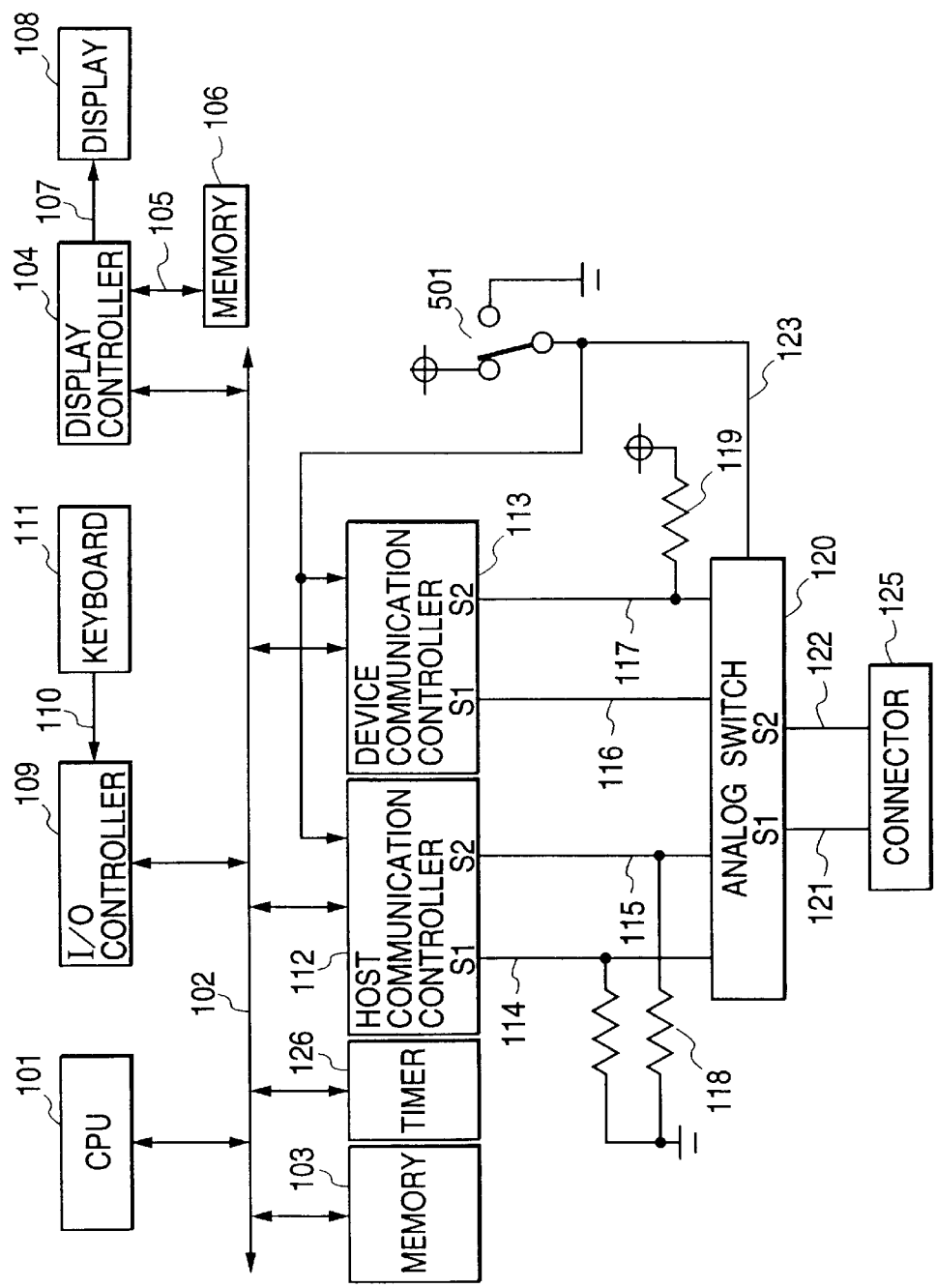
FIG. 5 is a structural diagram of manual switching.
Figure 6:
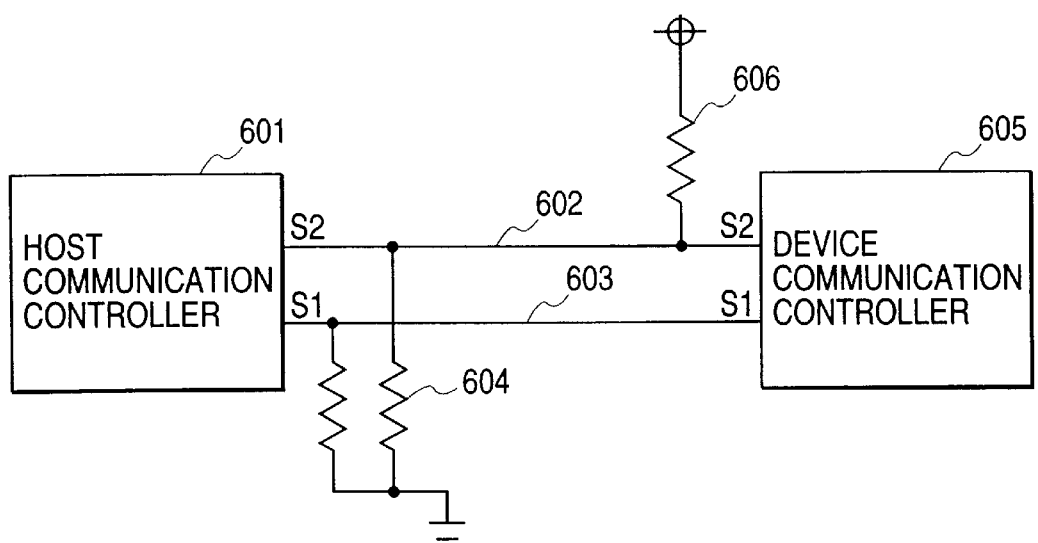
FIG. 6 is a structural diagram of the prior art.

FIG. 5 is a structural diagram of an information processing apparatus for manually switching between a host and a device.

In FIG. 5, a switch 501 is connected to a power source at one end and to GND at the other end. By selecting either one of them and connecting the control line to the switch 501, the state of the control line 123 can be controlled to "H" or "L" manually.

The state of the control line 123 is input into the host communication controller 112 and the device communication controller 113 like the third embodiment. One of the controllers is selected and activated according to the state of the control line 123. The subsequent operation is the same as that of the third embodiment.

According to the present invention, the output lines of the host communication controller and the device communication controller can be connected by one connector and the interfaces of a small information apparatus can be switched so that it can serve as a device or a host.

What is claimed is:

1. An information processing apparatus having a main body which comprises a CPU for executing a program, a memory for storing said program and data, a display for outputting the execution result of said program and an I/O controller for controlling key inputs, and a timer for controlling time, said apparatus comprising:

a host module for carrying out communication operation as a host of a network;

a first communication path connected to said host module;

a device module for carrying out communication operation as a device of a network;

a second communication path connected to said device module;

a controller unit for monitoring an electric potential of signal lines included in said first communication path; and a switch unit selecting either one of said first communication path and said second communication path based on a control signal from said controller unit, wherein said controller unit generates and outputs to said switch unit the control signal which designates that the information processing apparatus operate as a device when it is detected that the electric potential shows that another apparatus is connected to said network operating as a host and the information processing apparatus is operating as a host, and wherein said switch unit selects said second communication path when the information processing apparatus is designated to operate as a device.

2. An information processing apparatus according to claim 1, further comprising, memory means for sharing a memory module for the communication of said host module and a memory module for said communication of the device module.

3. An information processing apparatus according to claim 2, wherein said memory means has two memory modules for reading and writing and exchanges the two memory modules at the end of reading and writing packet-sized data.

4. An information processing apparatus according to claim 2, wherein said memory means has a write bus and a read bus and a memory which can be accessed to read and write simultaneously.

5. An information processing apparatus according to claim 1, wherein said controller unit is a two-input OR element which receives said inputs of the signal lines to said host module and outputs a control signal.

6. An information processing apparatus according to claim 1, wherein said switch unit is a manual switch.

* * * * *